United States Patent [19]
DeVault

[11] Patent Number: 5,467,614
[45] Date of Patent: Nov. 21, 1995

[54] DUAL-CIRCUIT, MULTIPLE-EFFECT REFRIGERATION SYSTEM AND METHOD

[75] Inventor: Robert C. DeVault, Knoxville, Tenn.

[73] Assignee: Martin Marietta Energy Systems, Inc., Oak Ridge, Tenn.

[21] Appl. No.: 194,901

[22] Filed: Feb. 14, 1994

[51] Int. Cl.⁶ .................................................. F25B 7/00
[52] U.S. Cl. ............................................................ 62/476
[58] Field of Search ............................. 62/476, 101, 112

[56] References Cited

U.S. PATENT DOCUMENTS

| | | | |
|---|---|---|---|
| 3,483,710 | 12/1969 | Bearint | 62/101 |
| 4,520,634 | 6/1985 | Oouchi et al. | 62/476 |
| 4,531,374 | 7/1985 | Alefeld | 62/79 |
| 4,542,628 | 9/1985 | Sarkisian et al. | 62/335 |
| 4,551,991 | 11/1985 | Miyoshi et al. | 62/476 |
| 4,646,541 | 3/1987 | Reid et al. | 62/476 |
| 4,667,485 | 5/1987 | Ball et al. | 62/476 |
| 4,732,008 | 3/1988 | DeVault | 62/79 |
| 4,827,728 | 5/1989 | De Vault et al. | 62/79 |
| 5,177,979 | 1/1993 | Gianfrancesco | 62/335 |
| 5,205,136 | 4/1993 | DeVault et al. | 62/476 |
| 5,295,371 | 3/1994 | Oonou et al. | 62/476 |
| 5,335,515 | 8/1994 | Rockenfeller et al. | 62/476 |

*Primary Examiner*—Henry A. Bennet
*Assistant Examiner*—William C. Doerrler
*Attorney, Agent, or Firm*—Earl L. Larcher; J. Donald Griffin; Harold W. Adams

[57] ABSTRACT

A dual circuit absorption refrigeration system comprising a high temperature single-effect refrigeration loop and a lower temperature double-effect refrigeration loop separate from one another and provided with a double-condenser coupling therebetween. The high temperature condenser of the single-effect refrigeration loop is double coupled to both of the generators in the double-effect refrigeration loop to improve internal heat recovery and a heat and mass transfer additive such as 2-ethyl-1-hexanol is used in the lower temperature double-effect refrigeration loop to improve the performance of the absorber in the double-effect refrigeration loop.

18 Claims, 2 Drawing Sheets

DUAL-CIRCUIT, MULTIPLE-EFFECT REFRIGERATION SYSTEM AND METHOD

BACKGROUND OF THE INVENTION

The present invention is directed to a dual circuit multiple effect absorption refrigeration system in which a single-effect high temperature refrigeration loop is combined with a lower temperature double-effect refrigeration loop by a double-condenser coupling with both of the generators in the double-effect refrigeration loop. This arrangement provides for internal heat recovery at a level essentially corresponding to that achieved by a triple-effect refrigeration loop using a double-condenser coupling and is improved thereover by enabling an alcohol or other heat and mass transfer additive to be used in the lower temperature double-effect refrigeration loop for improving absorber performance and the thermal efficiency of the overall system.

This invention was made with the support of the United States Government under contract No. DE-AC05-84OR21400 awarded by the U.S. Department of Energy, Office of Building Technologies. The United States Government has certain rights in this invention.

Recent developments in absorption refrigeration systems have provided significant improvements in the thermal efficiency or coefficient of performance (COP) over the basic commercial single-effect absorption refrigeration system which utilizes a single-effect absorption system comprising a generator, a condenser, an evaporator, and an absorber operatively coupled together and which typically provides a COP in the range of about 0.6 to 0.7.

An increase in the COP to about 1.0 to 1.3 was provided by the development of a double-effect refrigeration absorption system in which two generators with condensers operating at different temperatures are coupled to a single evaporator and absorber. The heat of condensation in the condenser coupled to the high temperature generator is used as the heat source for the lower temperature generator.

A corresponding increase in COP was achieved by the development of the dual-loop refrigeration absorption systems which utilized two separate single-effect refrigeration absorption loops operating at different temperatures. In this arrangement the higher temperature refrigeration loop provided the operating heat for the lower temperature refrigeration loop through a heat exchange coupling between at least the condenser in the higher temperature loop and the generator in the lower temperature loop. A typical dual-loop absorption refrigeration system is described in U.S. Pat. No. 4,542,628.

A different arrangement of the single-effect refrigeration loops utilized in the above-described dual-loop refrigeration system resulted in a triple-effect refrigeration system wherein the externally applied heat is utilized internally three times to produce the desired cooling effect at the evaporators. Such a triple-effect absorption refrigeration system is described in U.S. Pat. No. 4,732,008 and provides an increase in COP over that achieved with the dual-loop refrigeration systems.

Triple effect absorption refrigeration systems also includes arrangements wherein three generators and condensers with the condensers being individually coupled to a single evaporator. A typical triple-effect system utilizing such a three generator arrangement is described in U.S. Pat. Nos. 4,520,634 and 4,531,374 (FIG. 44G). The three sets of generators and condensers function at different temperatures and pressures. External heat is applied to the high temperature third generator while heat rejection from the high temperature third condenser is used to heat the medium temperature second generator. The heat of condensation from the medium temperature second condenser is used to heat the low temperature first generator. The condensed refrigerant from the first, second, and third condensers is evaporated in the evaporator to provide the desired refrigeration effect. The COP for such a triple-effect system is about 1.3 which corresponds to the higher thermal efficiencies provided by the double-effect and dual-loop systems described above.

More recent developments in multiple or triple-effect refrigeration systems which provided an increase in COP over earlier triple-effect refrigeration systems such as described above utilize an arrangement wherein the high temperature third condenser is double coupled to provide heat to both the medium temperature second generator and to the low temperature first generator for increasing internal heat recovery. Triple-effect refrigeration systems which utilize such a double-condenser coupling are described in U.S. Pat. Nos. 4,551,991 and 5,205,136. These patents directed to the triple-effect refrigeration system utilizing the double-condenser coupling as well as the other aforementioned patents are incorporated herein by reference.

While the triple-effect absorption refrigeration systems using a double-condenser coupling provide for significant improvements in thermal efficiency over other known multiple-effect absorption refrigeration system there is still a problem or shortcoming inherent in triple-effect absorption refrigeration systems operating in a relatively high temperature range which prevents these high temperature triple-effect systems from realizing their full potential with respect to thermal efficiency. For example, in triple-effect absorption system described in U.S. Pat. No. 5,205,136 the operating temperature of the high temperature third generator is required to be in a range of about 360° to 500° F. in order to achieve the improvements in thermal efficiency gained by utilizing the double-condenser coupling. In this and other prior triple-effect refrigeration systems the third generator and other components subjected to high temperatures greater than about 400° F. may be constructed of corrosion resistant materials in order to permit operation at temperatures higher than about 400° F. However, a standard heat and mass transfer additive such as 2-ethyl-1-hexanol as beneficially used in lower temperature single, double and dual effect absorption refrigeration systems for increasing absorber performance can not be similarly utilized in such high temperature triple-effect refrigeration systems since such know heat and mass transfer additives undergo decomposition at temperatures greater than about 360° F. Thus, the operation of high temperature triple-effect refrigeration systems achieved without the use of a standard alcohol or other known heat and mass transfer additive suffers reduced absorber performance and consequently a reduction in potential thermal efficiency.

SUMMARY OF THE INVENTION

Accordingly, a principal objective or aim of the present invention is to provide a dual-circuit absorption refrigeration system comprising a high temperature single effect refrigerator loop with a separate double-effect lower-temperature refrigeration loop and a double-condenser coupling between the high temperature condenser of the single-effect refrigeration loop and the two generators in the lower temperature double-effect refrigeration loop. This multiple-effect, two-circuit chiller with plural heat exchange features provides the internal heat recovery benefits achieved by triple-effect absorption refrigeration systems of the three generator type using double-condenser couplings as described in the aforementioned U.S. Pat. Nos. 4,551,991 and 5,205,136 and is improved thereover through the use of a standard heat and mass transfer additive in the lower temperatures double-effect refrigeration loop for improved absorber performance.

Generally, the present invention is a dual-loop or dual-circuit, multiple-effect absorption refrigeration system having a double-condenser coupling and comprises: a first refrigeration loop with first and second generator means, first and second condensing means, first evaporating means, and first absorber means operatively coupled together for the circulation of a first refrigerant-containing solution therethrough; a second refrigeration loop with third generator means, third condensing means, second evaporating means and second absorber means operatively coupled together for the circulation of a second refrigerant-containing solution therethrough; means for heating the second refrigerant-containing solution in the third generator means to a first refrigerant-vaporizing temperature; first heat exchange means coupled between the third condensing means and the second generator means for heating the first refrigerant-containing solution in the second generator means to a second refrigerant-vaporizing temperature which is lower than the first temperature; second heat exchange means coupled between the second condensing means and the first generator means for providing heat to the first refrigerant-containing adsorption solution in the first generator means; and third heat exchange coupled between the third condensing means and the first generator means for combining heat from vaporous refrigerant from the second refrigerant-containing absorption solution condensed in the third condensing means with the heat provided to the first refrigerant-containing solution in the first generator means by the second heat exchange means for heating the first refrigerant-containing solution in the first generator means to a third refrigerant-vaporizing temperature which is lower than the second temperature.

In the present invention the first refrigerant vaporizing temperature of the second refrigerant-containing solution in the generator of the second refrigeration loop is in the range of about 360°–500° F. and is sufficiently high to decompose an alcohol or other known heat and mass transfer additive if used therein. However, since the second and third refrigerant vaporizing temperature are lower than about 360° F., the first refrigerant-containing solution in the larger-capacity first refrigeration loop is provided with a heat and mass transfer additive to improve performance of the absorber means in the first refrigeration loop.

A fourth heat exchange means can be utilized in a heat exchange relationship between condensed first and second refrigerants of the first and second refrigeration loops for additional cooling of the first refrigerant prior to being received in the evaporator means of the first refrigeration loop.

Briefly, the operation of multiple-effect, two-circuit absorption refrigeration system of the present invention as described above is achieved by the steps which comprise: heating the second refrigerant-containing solution in the third generator means to a first temperature for vaporizing refrigerant contained therein; utilizing heat from the third condensing means for heating the first refrigerant-containing solution in the second generator means to a second refrigerant-vaporizing temperature that is lower than the first temperature; utilizing heat from the second condensing means for heating the first refrigerant-containing solution in the first generator; and combining heat from the third condensing means with heat provided to the first generator means by the second condensing means for together heating the first refrigerant-containing solution in the first generator means to a third refrigerant-vaporizing temperature that is lower than the second temperature.

In this method the first temperature provided to the second refrigerant-containing solution by the third generator means is in the range of about 360°–500° F., the second temperature is in the range of about 300°–360° F., and the third temperature is in the range of about 180°–0° F. Also, this method includes the step of utilizing a standard heat and mass transfer additive with the first refrigerant-containing absorption solution. This heat and mass transfer additive is preferably the alcohol 2-ethyl-1-hexanol but can be other known additives such as 1-nonylamine, 2-phenyl-ethanol-1, mononitrobenzene, and the like.

Other and further objects of the present invention will become obvious upon an understanding of the illustrative embodiment and method about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As generally described above, the present invention is directed to a multiple-effect absorption refrigeration system utilizing two refrigeration circuits that are separate from one another and formed of a high temperature single-effect refrigeration loop and a lower temperature double-effect refrigeration loop. The condenser in the high temperature single-effect refrigeration loop is double coupled to the two generators in the lower temperature double-effect refrigeration loop so as to obtain the same triple-effect thermodynamic cycle as provided by the double-condenser coupled triple-effect absorption refrigeration systems described in U.S. Pat. Nos. 4,551,991 and 5,205,136. The performance and thermal efficiency of the system of the present invention is improved over that of these patented and other previously known high temperature triple-effect refrigeration systems by the use of an alcohol heat and mass transfer additive in the double-effect refrigeration loop to increase the performance of the absorber in the double-effect refrigeration loop. The capacity of the double-effect loop for the weak refrigerant-containing solution is about 50–100 percent greater than that of the single-effect refrigeration loop so that any increase in the performance of the absorber in the larger capacity double-effect refrigeration loop provides a significant increase in the overall thermal efficiency of the combined refrigeration system.

Figure 1:
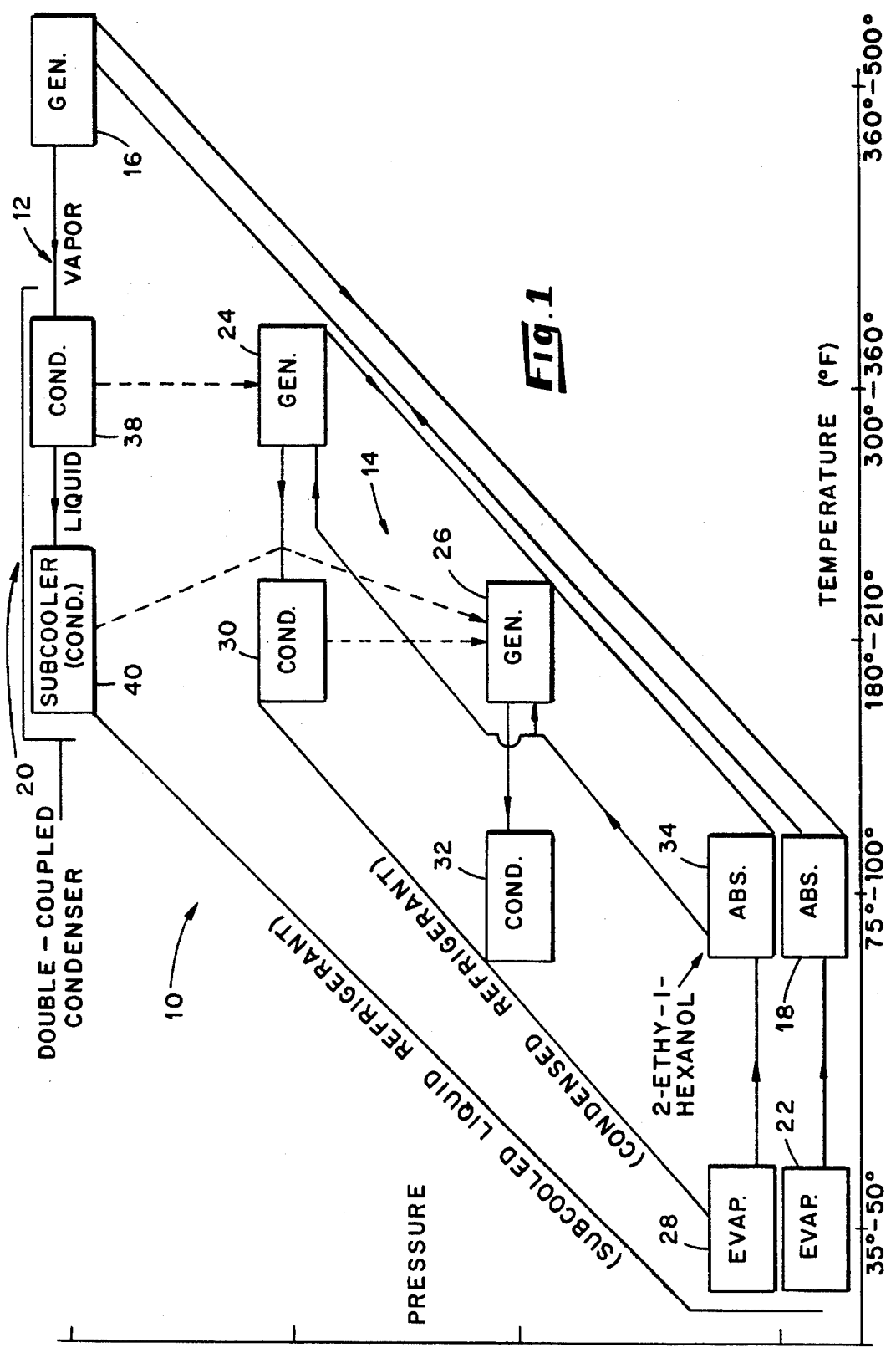
FIG. 1 is a schematic representation of a preferred embodiment of the present invention illustrating the dual-circuit, multiple-effect absorption refrigeration system with a double-condenser coupling condenser and the thermodynamic relationships of the system components.

With reference to FIG. 1, the dual circuit, double-condenser coupled absorption refrigeration system of the present invention is generally shown at 10 and comprises a high temperature single-effect refrigeration loop 12 in combination with a lower temperature double-effect refrigeration loop 14. The high temperature single-effect refrigeration loop 12 comprises a high temperature generator 16 coupled to an absorber 18, a high temperature condenser 20, and an evaporator 22. The condenser 20 which operates at the same or substantially the same pressure as the generator 16 condenses the vaporized refrigerant received from the generator 16 with the resulting liquid refrigerant being used in the evaporator 22 for providing the desired refrigeration effect by the vaporization of the liquid refrigerant. This vaporous refrigerant from the evaporator 22 is absorbed by the concentrated liquid absorbent in the absorber 18 and recycled as weak refrigerant-containing solution through the generator 16.

The double-effect refrigeration loop 14 comprises two generators 24 and 26 coupled in parallel with a single evaporator 28 for vaporizing liquid refrigerant from vaporized refrigerant discharged from the generators 24 and 26 and condensed to liquid in condensers 30 and 32, respectively. These condensers 30 and 32 are coupled to the evaporator 28 which provides cooling effect of the refrigeration system 10 in concert with the evaporator 22 in the single-effect refrigeration loop 12. As in the operation of the single-effect refrigeration loop 12, the vaporous refrigerant produced in the evaporator 28 is combined with the concentrated absorbent liquid in the absorber 34 and returned to generators 24 and 26.

In accordance with the present invention, sensible heat in the condensed refrigerant provided by high temperature condenser 20 in the single-effect refrigeration loop 12 is extracted for providing heat needed for heating in weak refrigerant-containing solution in the generators 24 and 26 in the double-effect refrigeration loop 14. To accomplish this double-condenser coupling, the condenser 20 is formed of two condenser components provided by a first condenser 38 which is used to condense the hot vaporized refrigerant from the generator 16 with this heat of condensation being transferred to the generator 24 in the double-effect refrigeration loop 14 for heating the weak refrigerant-containing solution therein to temperatures less than that used in generator 16 of the single-effect refrigeration loop 12 but sufficient to boil-off or vaporize the refrigerant from the weak refrigerant-containing solution in the generator 24. The second condenser component of the condenser 20 is provided by a subcooler 40 which is coupled to receive the hot condensed liquid refrigerant discharged from the condenser 38. The subcooler 40 is coupled in a heat exchange relationship with the generator 26 in a double-effect refrigeration loop 14 so that sensible heat in the hot liquid refrigerant remaining after being discharged from the condenser 38 can be used in combination with the heat of condensation from the hot vaporized refrigerant from generator 24 that is condensed in the condenser 30 as the heat source for heating the refrigerant-containing solution in the generator 26. With this double-coupled condenser 20, a significant percentage of the total heat in the condensed refrigerant liquid is internally recovered in the generators 24 and 26 of the double-effect refrigeration loop so as to provide a thermodynamic cycle corresponding to that in the triple-effect refrigeration systems disclosed in the aforementioned U.S. Pat. Nos. 4,551,991 and 5,205,136.

As illustrated in FIG. 1, the double-effect refrigeration loop 14 utilizes a parallel flow arrangement for feeding each of the two generators 24 and 26 with selected portions of the weak refrigerant-containing solution from the absorber 34. However, it will appear clear that these generators 24 and 26 can be coupled to the absorber 34 to receive the weak refrigerant-containing solution therefrom in a series flow arrangement.

In the multiple-effect, dual circuit absorption refrigeration system 10 the highest thermal efficiencies are achieved when externally heating the generator 16 in the single-effect refrigeration loop 12 to a temperature adequate to vaporize or boil-off the refrigerant from the weak refrigerant-containing liquid with the resulting vaporous refrigerant being at a sufficient temperature for providing adequate heat of condensation and sensible heating of the refrigerant liquid condensed in the double-coupled condenser 20 to vaporize the refrigerant from the weak refrigerant-containing solution in the generator 24 and in generator 26 when combined with the heat of condensation heat from the condenser 30 of the double-effect refrigeration loop 14. The external heating of the refrigerant-containing solution in the generator 16 of the single-effect refrigeration loop 12 considered to be sufficient for this purpose is provided by heating the weak refrigerant-containing solution in generator 16 to a temperature in the range of about 360°–500° F., with the higher temperature in this range being preferred and with a temperature of about 500° F. being the most preferred. As pointed out above in U.S. Pat. No. 5,205,136, the heating of the weak refrigerant-containing solution to temperatures greater than about 400° F. may cause corrosion problems to occur. This corrosion problem is similarly handled in the present system by constructing components of the single-effect refrigeration loop 12 exposed to such temperatures from a corrosion resistant material such as monel or a suitable stainless steel.

The refrigerant and the absorbent utilized to form the solution pair useable in high temperature single-effect refrigeration loop 12 and the lower temperature double-effect refrigeration loop 14 is preferably water and lithium bromide but any suitable commercially available solution pair including corrosion inhibitors in both the high temperature single-effect refrigeration loop 12 and the lower temperature double-effect refrigeration loop 14 may be utilized in the practice of the present invention. However, since standard alcohol and other heat and mass transfer additions such as 2-ethyl-1-hexanol to the solution pair and which are well known for increasing the performance of absorbers in absorption refrigeration systems tend to decompose at temperatures greater than about 360° F., such alcohol additions can not be satisfactorily used in high temperature triple-effect refrigeration systems as in U.S. Pat. Nos. 4,551,991, and 5,205,136, or in the high temperature single-effect refrigeration loop 12 of the present invention. This problem associated with the inability of using the beneficial alcohol and other heat and mass transfer additives in high temperature triple-effect absorption refrigeration is significantly mitigated by the present invention. Thus, while the operational temperatures in the single-effect refrigeration loop 12 are considered to be too high for using alcohol and other heat and mass transfer additives, the separate double-effect refrigeration loop 16 has operational temperatures below the decomposition temperatures of the standard alcohol and other heat and mass transfer additives so as to permit an alcohol or other heat and mass transfer additive to be combined with the solution pair used in the larger capacity lower temperature double-effect refrigeration loop 14. This heat and mass transfer addition to the solution pair substantially improves the performance of the absorber 34 and thereby increases the thermal efficiency of the overall refrigeration system 10.

The heat and mass transfer additive is preferably the alcohol 2-ethyl-1-hexanol but other known heat and mass transfer additives such as 1-nonylamine, 2-phenyl-ethanol-1, or mononitrobenzene may be satisfactorily used in the system of the present invention. Usually, about 100 ppm to about 5 percent of the volume of the weak refrigerant-containing solution used in the double-effect refrigeration loop 14 can be formed of the mass and heat transfer additive.

Figure 2:
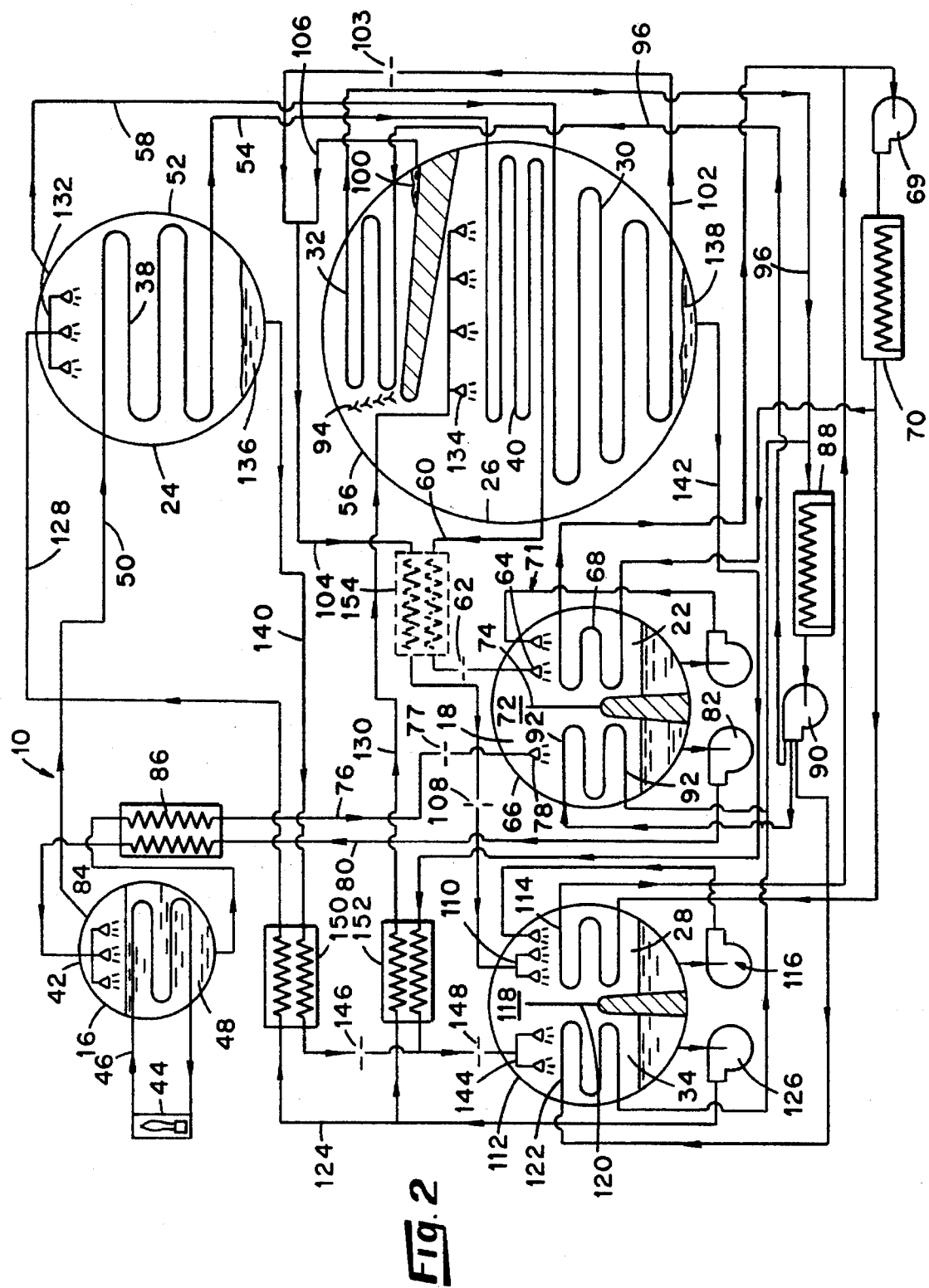
FIG. 2 is a schematic view illustrating the structural arrangement of the components in the dual-circuit, multiple-effect absorption refrigeration system of the present invention.

With reference to FIGS. 1 and 2, the generator 16 of the high temperature single-effect refrigeration loop 12 is shown contained within a shell 42. This generator 16 is externally heated by a suitable hydrocarbon burner 44 which provides a stream of hot fluid or hot flue gas through coil 46 in the generator 16 in a heat exchange relationship with the weak refrigerant-containing solution shown in the shell 42 at 48. The externally applied heat from the burner 44 heats the weak refrigerant-containing solution in generator 16 to a temperature in the range of about 360°–500° F. to vaporize or boil-off of the refrigerant from the absorbent liquid to concentrate the latter in the base portion of the generator 16. The vaporous refrigerant resulting from the vaporization of the weak refrigerant-containing solution in the generator 16 is discharged therefrom through conduit 50 into a coiled portion thereof defining the condenser 38 of the double-coupled condenser 20 and contained within the shell 52 of the generator 24 in the double-effect refrigeration loop 14. The heat of condensation rejected from the condensing refrigerant vapor in condenser 38 is used in heat exchange to heat the weak refrigerant-containing solution within the generator 24 to a temperature in the range of about 300° F.–360° F. for vaporizing the refrigerant contained therein. The resulting hot condensate or liquid refrigerant which is also at a temperature in the range of about 300°–360° F. is passed from the condenser 38 through conduit 54 into a coiled portion thereof defining the subcooler 40 of the double-coupled condenser 20 that is contained within shell 56 of the generator 26 in the double-effect refrigeration loop 14. Sensible heat in this hot liquid refrigerant discharged from the temperature condenser 38 is transferred by heat exchange to the weak refrigerant-containing solution in the generator 26. This heat from the hot refrigerant liquid in the subcooler 40 is combined with the heat of condensation provided by the condensation of vaporous refrigerant discharged through conduit 58 from the generator 24 and into a coiled portion of conduit 58 contained in the shell 56 of generator 26 and defining the condenser 30 of the double-effect refrigeration loop 14 for vaporizing the portion of weak refrigerant-containing solution employed in the generator 26. The weak solution in this generator 26 is heated by these two refrigerant streams to a temperature in the range of about 180°–210° F.

The liquid refrigerant discharged from the subcooler 40 is at a temperature in the range of about 180°–210° F. flows via conduit 60 containing a suitable flow restrictor or expansion valve 62 and spray head 64 into the evaporator 22 contained in the evaporator-absorber housing 66 of the single-effect refrigeration loop 12. The evaporation of the liquid refrigerant sprayed into the evaporator 22 of the single-effect refrigeration loop 12 cools the resulting refrigerant vapor to a temperature of about 35°–50° F. The cooling effect provided by such evaporation can be extracted from the evaporator 22 by using an evaporator coil 68 in the evaporator 22 with this coil 68 connected through pump 69 to a suitable work load envisioned for the refrigeration device such as generally indicated by the chilled water heat exchanger 70.

In order to promote the evaporation of the refrigerant in the evaporator 22, the refrigerant liquid therein can be recirculated through the evaporator 22 by employing a conduit, pump and spray head arrangement as generally shown at 71.

Refrigerant vapor in the evaporator section 22 of housing 66 flows into the absorber 18 section of the housing 66 through an opening 72 in a vertical partition 74 which separates the evaporator section 22 from the absorber section 18. This refrigerant vapor is absorbed by the concentrated absorbent liquid conveyed into the absorber 18 from the generator 16 via line 76, expansion valve 77, and spray head 78 contained in the absorber 18 so as to dilute or weaken the absorbent solution which is then conveyed into the generator 16 via conduit 80, pump 82 and spray heads 84. A heat exchanger 86 can be coupled between conduits 76 and 80 so that heat can be extracted from the concentrated absorbent 48 discharged from the generator 16 while heating the weak refrigerant-containing solution being conveyed into the generator 16. To promote the absorption of the refrigerant vapor from the evaporator 22 by the absorbent solution in the absorber 18, a relatively cool heat-exchange liquid such as water from a cooling tower 88 may be circulated by a pump 90 through a coil 92 supported in the absorber 18.

In the double-effect refrigeration loop 14, the vaporous refrigerant produced in the generator 26 passes through the demister 94 and is condensed to liquid by the condenser 32 which utilizes a heat exchange medium flowing in conduit 96 coupled to the cooling tower 88. The condensed refrigerant of the double-effect refrigeration loop 14 from the condenser 30 and the condensed refrigerant produced by the condenser 32 as shown at 100 are each at a temperature in the range of about 75°–100° F. The liquid refrigerant produced by the condenser 30 is conveyed from the shell 56 of the generator 26 via conduit 102 and flow restrictor or expansion valve 103 into conduit 104 where it is combined with the liquid refrigerant 100 discharged from the shell 56 through line 106. This combined flow of condensed refrigerant in the double-effect refrigeration loop 14 flows through conduit 104 containing an expansion valve or flow restrictor 108 and spray head 110 into the evaporator 28 contained in the evaporator-absorber housing 112 of the double-effect refrigeration loop 14.

The evaporator 28 of the double-effect refrigeration loop 14 like the evaporator 22 of the single-effect refrigeration loop 12 provides for the evaporation of the liquid refrigerant sprayed into the evaporator via spray head 110 to yield refrigerant vapor at a temperature of about 35° F.–50° F. as shown in FIG. 1. As with the evaporator 22 of the single-effect refrigeration loop, the cooling effect of the refrigerant vapor is shown extracted by placing an evaporator coil 114 in the evaporator 28 and coupling the coil 114 to the chilled water heat exchanger 70. As shown, the pump 69 provides for circulating a heat exchange medium such as water through both of the evaporator coils 68 and 114. Also, the refrigerant liquid in the base of the evaporator 28 is recirculated by a conduit, pump and spray head arrangement 116.

The vaporous refrigerant from the evaporator section 28 of the housing 112 passes through opening 118 above partition 120 and into the absorber section 34 of the housing 112 where the vaporous refrigerant mixes with the concentrated absorbent produced in the generators 24 and 26 to form a pool of weak refrigerant-containing solution. The mixing or dilution of the absorbent solution in the absorber is enhanced by circulating a portion of the heat exchange liquid from the cooling tower 88 through coil 122 contained in the absorber 34. The weak refrigerant-containing solution is conveyed from the absorber through conduit 124 containing pump 126 into conduits 128 and 130 for the parallel feed of the weak refrigerant-containing solution into generators 24 and 26 via spray heads 132 and 134, respectively.

The concentrated absorbent solution produced in the generators 24 and 26 and shown in pools 136 and 138 at the base of the generators 24 and 26 is conveyed into the absorber 34 through conduits 140 and 142 and spray heads 144. As shown, conduit 140 is provided with a flow restrictor or expansion valve 146 upstream of the coupling between conduits 140 and 142 for reducing the pressure of the absorbent solution discharged from the generator 24 to a pressure substantially corresponding to the pressure in generator 26. Also, conduit 142 downstream of the coupling with conduit 140 is provided with a flow restrictor or expansion valve 148 for reducing the pressure of the combined streams of absorbent solution to the substantially the pressure utilized in the absorber 34 and the evaporator 28.

As described above, the weak refrigerant-containing solution discharged from the base of the absorber 34 and is circulated by parallel flow through the generators 24, and 26 to provide for the vaporization and removal of the refrigerant from the absorbent and the return of the concentrated absorbent liquid to the absorber 34. Satisfactory results have been achieved by dividing this flow of weak refrigerant-containing solution so that about 45 to 65 percent of the flow is conveyed to the generator 24. Heat exchangers 150 and 152 are shown provided in this parallel circuit between the conduits 128 and 140 and between the conduits 130 and 142, respectively, so that heat can be transferred from the concentrated absorbent liquid discharged from the generators 24 and 26 to the weak refrigerant-containing solution entering these generators. This heat exchange arrangement along with the heat exchanger 86 decreases the heating requirements for effecting the vaporization of the refrigerant in all three of the generators and the extent of cooling required of the concentrated absorbent liquid entering the absorbers 18 and 34 so at to increase the efficiency of the internal heat recovery for the refrigeration system 10.

In addition to the heat exchangers 86, 150, and 152 and their functions, a further heat exchanger 154 can be placed between the conduits 60 and 104 for additional cooling of the refrigerant liquid being conveyed into the evaporator 28 of the double-effect refrigeration loop 14. This additional cooling of the refrigerant liquid in the double-effect refrigeration loop 14 is beneficial since it augments the cooling effect in evaporator 28 of the dual-effect refrigeration loop 14.

It will be seen that the present invention provides an absorption refrigeration system which possesses the same triple-effect thermodynamic cycle as provided by known triple-effect absorption refrigeration systems with double-condenser couplings as described in U.S. Pat. Nos. 4,551, 991 and 5,205,136 and which has improved performance characteristics over such triple-effect systems through the use of conventional alcohol heat and mass transfer additives in the larger capacity double-effect refrigeration loop. Also, the dual-circuit, double-condenser coupled refrigeration system of the present invention using parallel flow between the generators in the lower temperature double-effect refrigeration loop is thermodynamically equivalent to the known parallel flow triple-effect systems with double-condenser couplings without requiring the parallel splitting of absorbent flow to all three generators as used in triple-effect refrigeration systems.

What is claimed is:

1. A dual loop multiple-effect absorption refrigeration system having a double-condenser coupling comprising:

a first refrigeration loop defined by a double-effect absorption refrigeration loop comprising first and second generator means, first and second condensing means, first evaporating means, and first absorber means operatively coupled together for the circulation of a first refrigerant-containing solution therethrough and with the first and second condensing means adapted to respectively receive vaporous refrigerant from the first and second generator means for condensing the vaporous refrigerant;

a second refrigeration loop in combination with said first refrigeration loop and defined by a single-effect refrigeration loop comprising third generator means, third condensing means, second evaporating means and second absorber means operatively coupled together for the circulation of a second refrigerant-containing solution therethrough;

means for heating the second refrigerant-containing absorption solution in the third generator means to a first refrigerant-vaporizing temperature;

first heat exchange means coupled to the third condensing means and to the second generator means for heating the first refrigerant-containing solution in the second generator means to a second refrigerant-vaporizing temperature which is lower than said first temperature;

second heat exchange means coupled to the second condensing means and the first generator means for providing heat to the first refrigerant-containing solution in the first generator means; and third heat exchange means coupled between the third condensing means and the first generator means and in heat exchange relationship with the first refrigerant-containing solution in said first generator means for combining heat from vaporous refrigerant from the second refrigerant-containing solution condensed in the third condensing means with said heat provided to the first refrigerant-containing solution in the first generator means by said second heat exchange means for heating the first refrigerant-containing solution in the first generator means to a third refrigerant-vaporizing temperature which is lower than said second temperature.

2. A dual loop multiple-effect absorption refrigeration system having a double-condenser coupling as claimed in claim 1, wherein said first temperature is greater than about 360° F., and wherein the first refrigerant-containing solution includes a heat and mass transfer additive.

3. A dual loop multiple-effect absorption refrigeration system having a double-condenser coupling as claimed in claim 2, wherein said first temperature is in the range of about 360°–500° F., wherein said second temperature is in the range of about 300°–360° F., and wherein said third temperature is in the range of about 180°–210° F.

4. A dual loop multiple-effect absorption refrigeration system having a double-condenser coupling as claimed in claim 1, wherein the first and second generator means are coupled in parallel to the first absorber means for providing each generator means with a selected portion of the first refrigerant-containing absorption solution.

5. A dual loop multiple-effect absorption refrigeration system having a double-condenser coupling as claimed in claim 3, wherein the second generator receives about 45 to 65 percent of the first refrigerant-containing solution from the first absorber means, and wherein the third generator means receives 100 percent of the second refrigerant-containing solution from the second absorber means.

6. A dual loop multiple-effect absorption refrigeration system having a double-condenser coupling as claimed in claim 1, wherein the third condensing means comprises condenser means coupled to the third generator means for condensing to liquid refrigerant the vaporous refrigerant of the second refrigerant-containing solution received by the condenser means and cooler means coupled to the condenser means for receiving liquid refrigerant therefrom.

7. A dual loop multiple-effect absorption refrigeration system having a double-condenser coupling as claimed in claim 6, wherein the first heat exchange means are coupled between the condenser means and the second generator means, and wherein the third heat exchange means are coupled between the cooler means and the first generator means.

8. A dual loop multiple-effect absorption refrigeration system having a double-condenser coupling as claimed in claim 1, wherein fourth heat exchange means are adapted to place liquid refrigerant of the second refrigerant-containing solution discharged from said third heat exchange means in a heat exchange relationship with liquid refrigerant of the first refrigerant-containing solution discharged from said first and second condensing means for cooling the liquid refrigerant of the first refrigerant-containing solution.

9. A method for operating a dual loop multiple-effect absorption refrigeration system comprising first and second refrigeration loops with the first refrigeration loop having first and second generator means, first and second condensing means, first evaporating means, and first absorber means operatively coupled together and with the first and second condensing means respectively receiving and condensing hot vaporous refrigerant of a first refrigerant-containing solution from the first and second generator means in conjunction, and with the second loop having third generator means, third condensing means, second evaporating means, and second absorber means operatively coupled together with the third condensing means receiving and condensing hot vaporous refrigerant of a second refrigerant-containing solution from the third generator means, said method comprising the steps of:

heating the second refrigerant-containing solution in the third generator means to a first temperature for vaporizing refrigerant contained therein;

utilizing heat from the third condensing means for heating the first refrigerant-containing solution in the second generator means to a second refrigerant-vaporizing temperature that is lower than said first temperature; utilizing heat from the second condensing means for heating the first refrigerant-containing solution in the first generator means: and utilizing heat from the third condensing means with the heat provided to the second condensing means by the vaporous refrigerant from the second generator means for heating the first refrigerant-containing solution in the first generator means to a third refrigerant-vaporizing temperature which is lower than said second temperature.

10. A method for operating a dual loop multiple-effect absorption refrigeration system as claimed in claim 9, wherein said first temperature is in the range of about 360° to about 500° F., wherein said second temperature is in the range of about 300°–360° F., and wherein said third temperature is in the range of about 180°–210° F.

11. A method for operating a dual loop multiple-effect absorption refrigeration system as claimed in claim 10, wherein the first refrigerant-containing absorption solution comprises a heat and mass transfer additive.

12. A method for operating a dual loop multiple-effect absorption refrigeration system as claimed in claim 11, wherein the heat and mass transfer additive is 2-ethyl-1-hexanol, 1-nonylamine, 2-phenyl-ethanol-1, or mononitrobenzene.

13. A method for operating a dual loop multiple-effect absorption refrigeration system as claimed in claim 12, wherein the heat and mass transfer additive provides about 100 ppm to about 5 percent of the volume of the first refrigerant-containing solution.

14. A method for operating a dual loop multiple-effect absorption refrigeration system as claimed in claim 13, wherein the first refrigerant-containing solution comprises lithium bromide and water.

15. A method for operating a dual loop multiple-effect absorption refrigeration system as claimed in claim 9, including the step of coupling the first and second generator means in a parallel flow arrangement with the first absorber means for providing the first and second generator means with the first refrigerant-containing solution from the first absorber means, concentrating the first refrigerant-containing solution in the first and second generator means, and passing the concentrated refrigerant absorption solution in a heat exchange relationship with the first refrigerant-containing absorption solution for heating the latter prior to being received by each of said first and second generator means.

16. A method for operating a dual loop multiple-effect absorption refrigeration system as claimed in claim 15, including the steps of providing the second generator means with about 45 to 65 percent of the first refrigerant-containing solution from the first absorber means, and providing the third generator means with 100 percent of the second refrigerant-containing solution from the second absorber means.

17. A method for operating a multiple-effect absorption refrigeration system as claimed in claim 9, wherein the step of utilizing the heat from the third condensing means with the heat provided to the second condensing means is provided by the steps of condensing to liquid the vaporous refrigerant received in the third condensing means from the third generator means, and extracting heat from the condensed liquid refrigerant from the third condensing means for heating the refrigerant-containing absorption solution in the first generator means.

18. A method for operating a dual loop multiple-effect absorption refrigeration system as claimed in claim 9, including the additional step of passing condensed vaporous refrigerant from the third condensing means in a heat exchange relationship with the condensed vaporous refrigerant from the first and second condensing means for cooling the condensed vaporous refrigerant from the first and second condensing means.

* * * * *